(12) United States Patent
Hewitt et al.

(10) Patent No.: US 11,254,370 B2
(45) Date of Patent: Feb. 22, 2022

(54) C-PILLAR TO BOX SIDE TO CAB BACK JOINT

(71) Applicant: Ford Global Technologies, LLC, Dearborn, MI (US)

(72) Inventors: Daniel Hewitt, Amherstburg (CA); Srinath Vijayakumar, Farmington, MI (US); Satish Ganti, Canton, MI (US); Vince Anthony Chimento, Plymouth, MI (US); Matthew Brooke, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/928,112

(22) Filed: Jul. 14, 2020

(65) Prior Publication Data
US 2022/0017154 A1    Jan. 20, 2022

(51) Int. Cl.
*B62D 65/02*    (2006.01)
*B62D 27/02*    (2006.01)

(52) U.S. Cl.
CPC .......... *B62D 27/023* (2013.01); *B62D 65/02* (2013.01)

(58) Field of Classification Search
CPC ...... B62D 65/02; B62D 27/023; B62D 33/06; B62D 33/023
USPC ................ 296/183.1, 190.01, 190.08, 29, 30
See application file for complete search history.

(56) References Cited

U.S. PATENT DOCUMENTS

| | | |
|---|---|---|
| 7,766,416 B2 | 8/2010 | McClure et al. |
| 8,960,776 B2 | 2/2015 | Boettcher et al. |
| 10,137,943 B2 | 11/2018 | Rompage et al. |

OTHER PUBLICATIONS

Behm, S. (2017). The 2017 Honda Ridgeline. Honda R&D Americas, Inc.—GDIS2017. May 17, 2017. pp. 1-35.

*Primary Examiner* — Dennis H Pedder
(74) *Attorney, Agent, or Firm* — David Coppiellie; Carlson, Gaskey & Olds, P.C.

(57) ABSTRACT

A structural joint for a pickup truck, according to an exemplary aspect of the present disclosure includes, among other things, a C-pillar, a gusset bracket, a cab back bracket, and a box panel. The C-pillar, gusset bracket, cab back bracket, and box panel are directly welded to each other to provide an assembly having a box section.

20 Claims, 6 Drawing Sheets

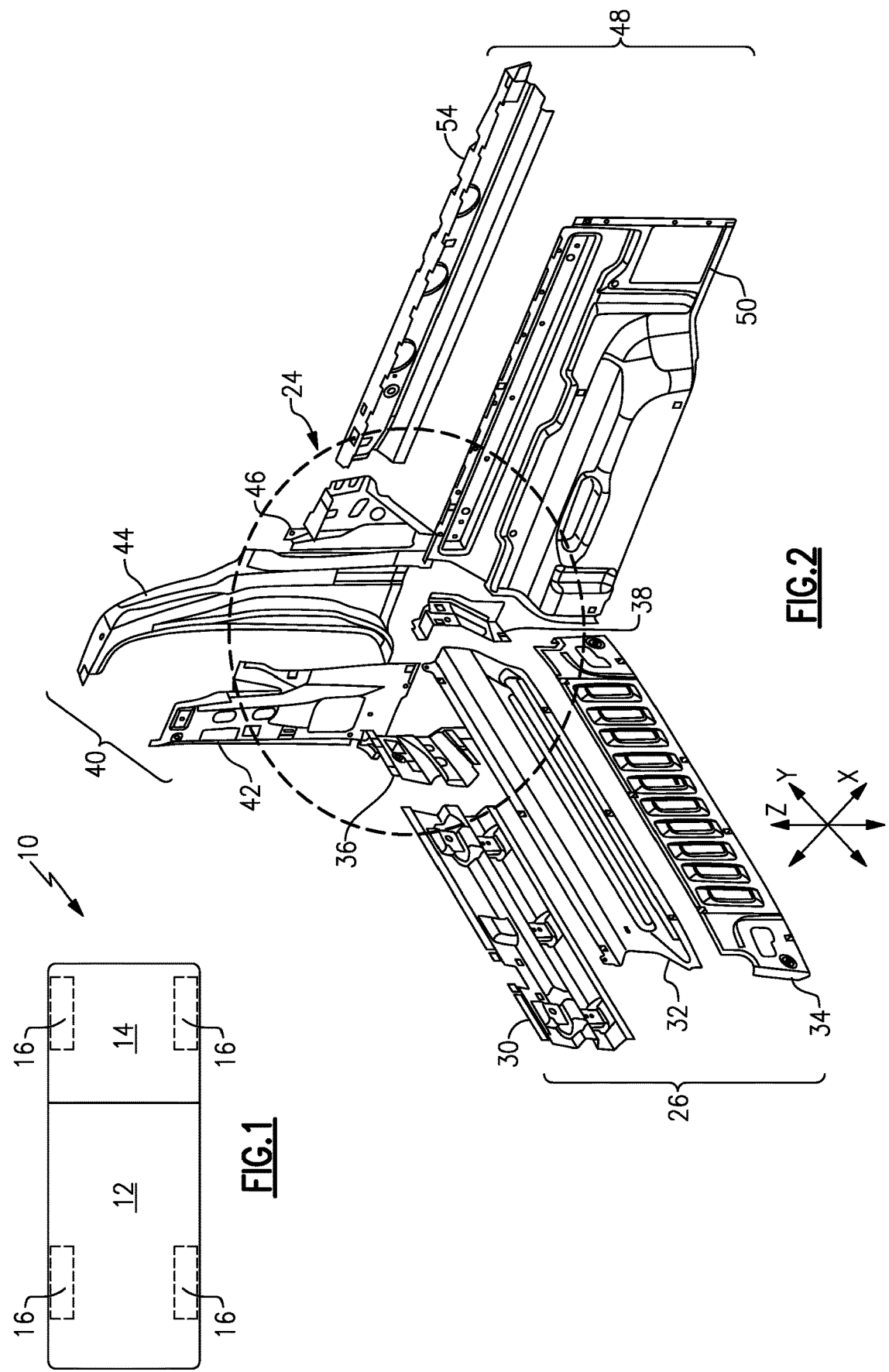

C-PILLAR TO BOX SIDE TO CAB BACK JOINT

TECHNICAL FIELD

This disclosure relates generally to a pillar, box, and cab joint for a unibody vehicle.

BACKGROUND

A typical pickup truck body has a separate cab and box that are attached to a vehicle frame. A unibody pickup truck does not have a frame, and as a result, the c-pillar, cab back, and box side converge at a structural joint. The structural joint should be capable of providing various structural features and characteristics.

SUMMARY

An apparatus according to an exemplary aspect of the present disclosure includes, among other things, structural joint for a pickup truck that includes a C-pillar, a gusset bracket, a cab back bracket, and a box panel. The C-pillar, gusset bracket, cab back bracket, and box panel are directly welded to each other to provide an assembly having a box section.

In a further non-limiting embodiment of the apparatus, the assembly is mated to a cab back lower panel.

In a further non-limiting embodiment of any of the foregoing apparatus, the pickup truck comprises a unibody pickup truck having a box associated with a cab via the structural joint that comprises the box section, and wherein the box section is continuously maintained along a cross-vehicle width of the box panel.

In a further non-limiting embodiment of any of the foregoing apparatus, the box panel comprises a box inner panel attached to a box rail, and wherein the cab back bracket is attached to a cab back panel.

In a further non-limiting embodiment of any of the foregoing apparatus, the assembly is for a unibody configuration.

In a further non-limiting embodiment of any of the foregoing apparatus, the C-pillar comprises a pillar outer panel and a pillar inner panel that are secured together at a flange interface, and wherein the cab back bracket is also attached to the flange interface.

In a further non-limiting embodiment of any of the foregoing apparatus, the box panel comprises a box inner panel that is securable to a box rail, and wherein the box inner panel is attached to the flange interface.

In a further non-limiting embodiment of any of the foregoing apparatus, the gusset bracket is attached to the pillar outer panel at a first attachment and is attached to the box rail at a second attachment that is separate from the first attachment, and wherein the box rail is attached to the pillar outer panel at a third attachment that is separate from the first and second attachments.

In a further non-limiting embodiment of any of the foregoing apparatus, the cab back bracket comprises a cab back outer bracket, and including a cab back inner panel, a cab back outer panel secured to the cab back inner panel, a cab back lower panel secured to at least the cab back outer panel, and a cab back inner bracket that is attached to the pillar inner panel, and wherein the cab back outer bracket is attached to the pillar inner panel separate from the cab back inner bracket.

An apparatus, according to yet another exemplary aspect of the present disclosure includes, among other things, a unibody pickup truck that includes a cab and a box associated with the cab via a structural joint. The structural joint comprises a C-pillar, a gusset bracket, a cab back bracket, and a box panel. The C-pillar, gusset bracket, cab back bracket, and box panel are directly welded to each other to provide an assembly having a box section.

In a further non-limiting embodiment of any of the foregoing apparatus, the cab back bracket comprises a cab back outer bracket, and including a cab back inner panel, a cab back outer panel secured to the cab back inner panel, a cab back lower panel secured to at least the cab back outer panel, and a cab back inner bracket that is attached to the C-pillar separate from the cab back outer bracket.

In a further non-limiting embodiment of any of the foregoing apparatus, the assembly is mated to the cab back lower panel.

In a further non-limiting embodiment of any of the foregoing apparatus, the C-pillar comprises a pillar outer panel and a pillar inner panel that are secured together at a flange interface, and wherein the cab back outer bracket is also attached to the flange interface.

In a further non-limiting embodiment of any of the foregoing apparatus, the box panel comprises a box inner panel that is securable to a box rail, and wherein the box inner panel is attached to the flange interface.

In a further non-limiting embodiment of any of the foregoing apparatus, the gusset bracket is attached to the pillar outer panel at a first attachment and is attached to the box rail at a second attachment that is separate from the first attachment, and wherein the box rail is attached to the pillar outer panel at a third attachment that is separate from the first and second attachments.

In a further non-limiting embodiment of any of the foregoing apparatus, the box section is continuously maintained along a cross-vehicle width of the box panel.

A method according to still another exemplary aspect of the present disclosure includes, among other things, directly welding a C-pillar, a gusset bracket, a cab back bracket, and a box panel to each other to provide an assembly having a box section for a unibody pickup truck.

In a further non-limiting embodiment of the foregoing method, the method includes associating a box of the unibody pickup truck with a cab via a structural joint that comprises the box section, and wherein the box section is continuously maintained along a cross-vehicle width of the box panel.

In a further non-limiting embodiment of any of the foregoing methods, the box panel comprises a box inner panel attached to a box rail, and wherein the cab back bracket is attached to a cab back panel.

In a further non-limiting embodiment of any of the foregoing methods, the method includes mating the assembly to a cab back lower panel.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 schematically illustrates a unibody pickup truck.

FIG. 2 is an exploded view of a C-pillar to box to cab back structural joint for the unibody pickup truck of FIG. 1.

DETAILED DESCRIPTION

Figure 3:
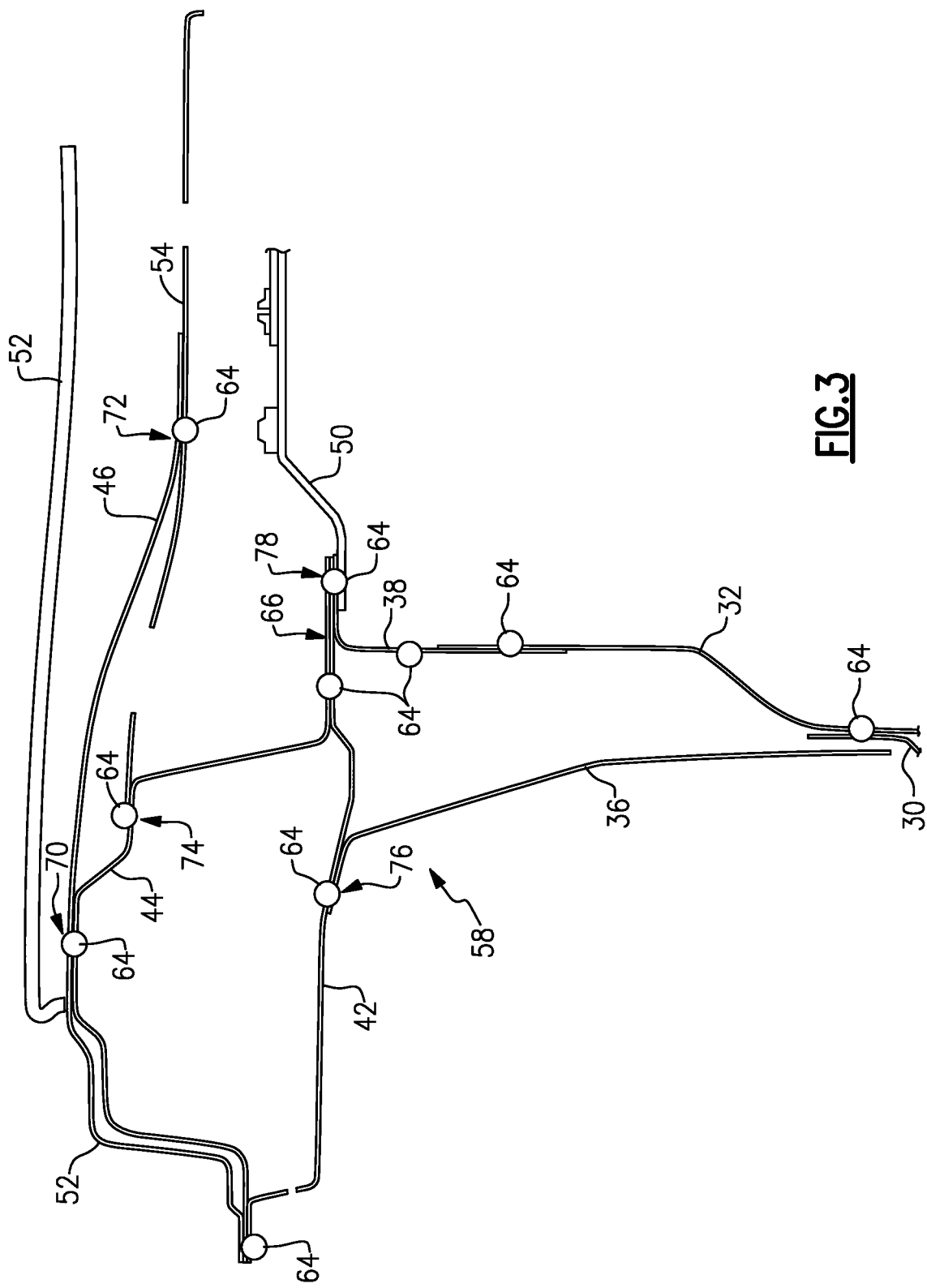
FIG. 3 is a Z section view of the C-pillar to box interface.

This disclosure details an exemplary pillar, box, and cab joint for a unibody vehicle. A unibody pickup truck 10 is shown in FIG. 1. The unibody pickup truck 10 has a box 12 and a cab 14 that are supported by wheels 16. As the truck 10 has a unibody configuration, the box 12 and cab 14 are not supported on a vehicle frame. As such, a back of the cab 14, a rear side of the box 12, and a pillar structure converge at a structural joint 24.

The structural joint 24 is shown in greater detail in FIGS. 2-10. A cab portion 26 includes a cab back inner panel 30, a cab back outer panel 32, and a cab back lower panel 34 that extends downwardly from the cab back inner 30 and outer 32 panels in the Z-direction. The cab portion 26 further includes a cab back inner bracket 36 and a cab back outer bracket 38. As shown in FIG. 2, the Z-direction refers to a vertical direction, the X-direction refers to a direction extending along a length of the truck 10 from the front to the back, and the Y-direction refers to a direction extending along a vehicle cross-wise or width of the truck 10.

A C-pillar 40 comprises a C-pillar inner panel 42, a C-pillar outer panel 44, and a gusset bracket 46. A box portion 48 includes a box inner panel 50, a box outer panel 52 (FIG. 3), and a box rail 54. The structural joint 24 comprises the C-pillar 40, the gusset bracket 46, the cab back inner bracket 36, and the box inner panel 50. In one example, the C-pillar 40, gusset bracket 46, cab back inner bracket 36, and box inner panel 50 are directly welded to each other to provide an assembly 58 having a box section as shown in FIG. 3.

The assembly 58 is welded together with appropriate body sealer between the various components to create a single box section. The assembly 58 is mated to the cab back lower panel 34 (which, in one example, comprises a single sheet of material) with body sealer and expandable sealer baffles installed. The cab back upper assembly is a continuous cross vehicle double box section 60 (FIG. 10) and tapers to a single box section where it mates back to the cab back inner and outer brackets 36, 38. Weld access holes 62 (FIG. 6) allow for other components, such as the cab back upper assembly, for example, to be attached to the assembly. Layered and staggered edges allow for all spot welds 64 to be maximum 3-thickness to become structural welds. Straight seams at exposed part edges allow for paint shop sealer to be applied over exposed seams, which provides additional leak protection while meeting exterior appearance standards.

As discussed above, the assembly 58 that provides the box section is continuously maintained along a cross-vehicle width of the box panel. As shown in FIG. 3, the cab back outer bracket 38 is attached to a cab back outer panel 32 with at least one spot weld 64. The C-pillar outer panel 44 and the C-pillar inner panel 42 are secured together at a flange interface 66. The cab back outer bracket 38 is also attached to the flange interface 66. The cab back outer panel 32 is attached to the opposite side of the cab back outer bracket 38. The box inner panel 50 is securable to the box rail 54, and the box inner panel 50 is also attached to the flange interface 66.

The gusset bracket 46 is attached to the C-pillar outer panel 44 at a first attachment 70 and is attached to the box rail 54 at a second attachment 72 that is separate from the first attachment 70. The box rail 54 is attached to the C-pillar outer panel 44 at a third attachment 74 that is separate from the first 70 and second 72 attachments.

Figure 4:
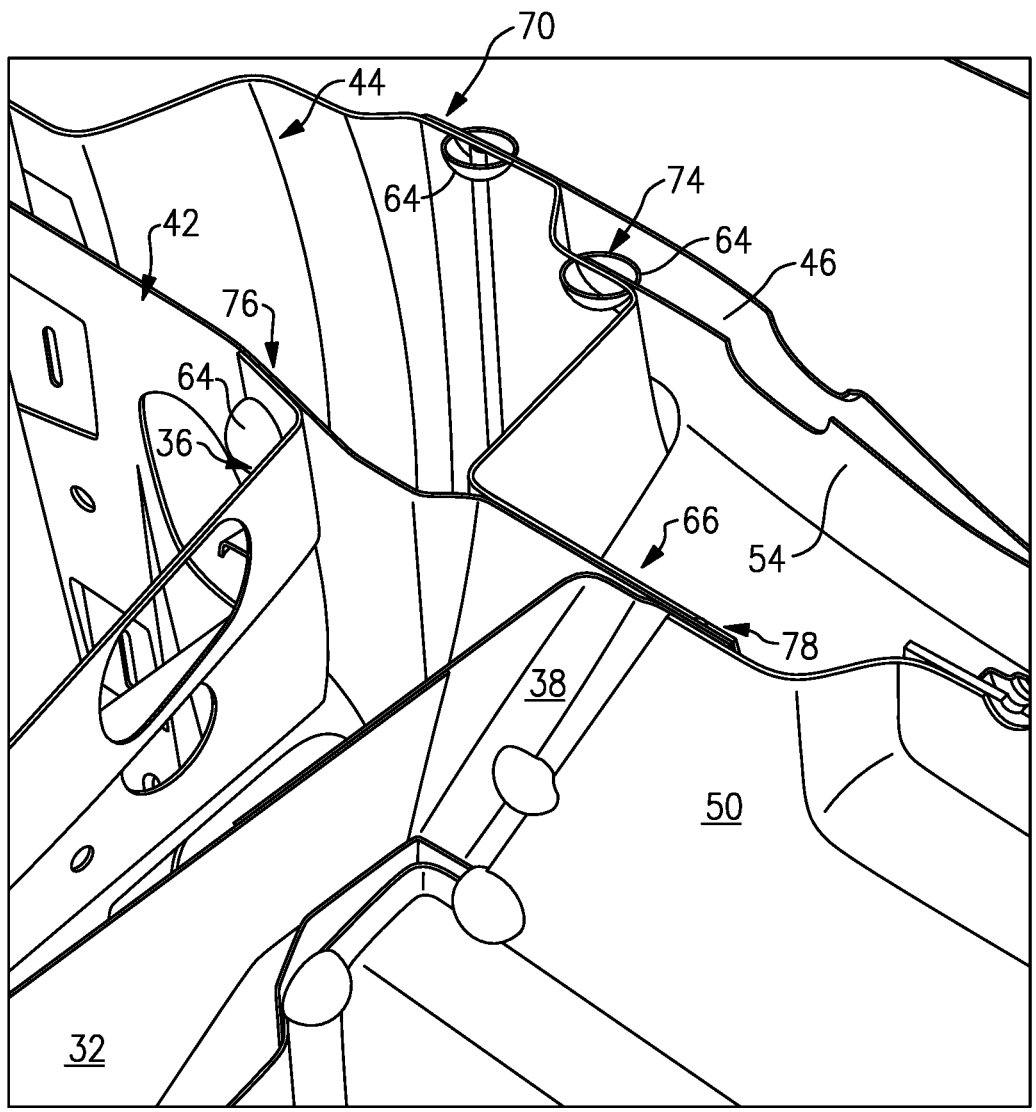
FIG. 4 is a cutaway Z section view of the C-pillar to box interface.

As shown in FIGS. 2-4, the cab back outer panel 32 is secured to the cab back inner panel 30, the cab back lower panel 34 is secured to at least the cab back outer panel 32 (schematically shown in FIG. 7), and the cab back inner bracket 36 is attached to the C-pillar inner panel 42 at an attachment 76. The cab back outer bracket 38 is attached to the C-pillar inner panel 42 at an attachment 78 that is separate from that of the cab back inner bracket 36 (FIG. 3).

Figure 5:
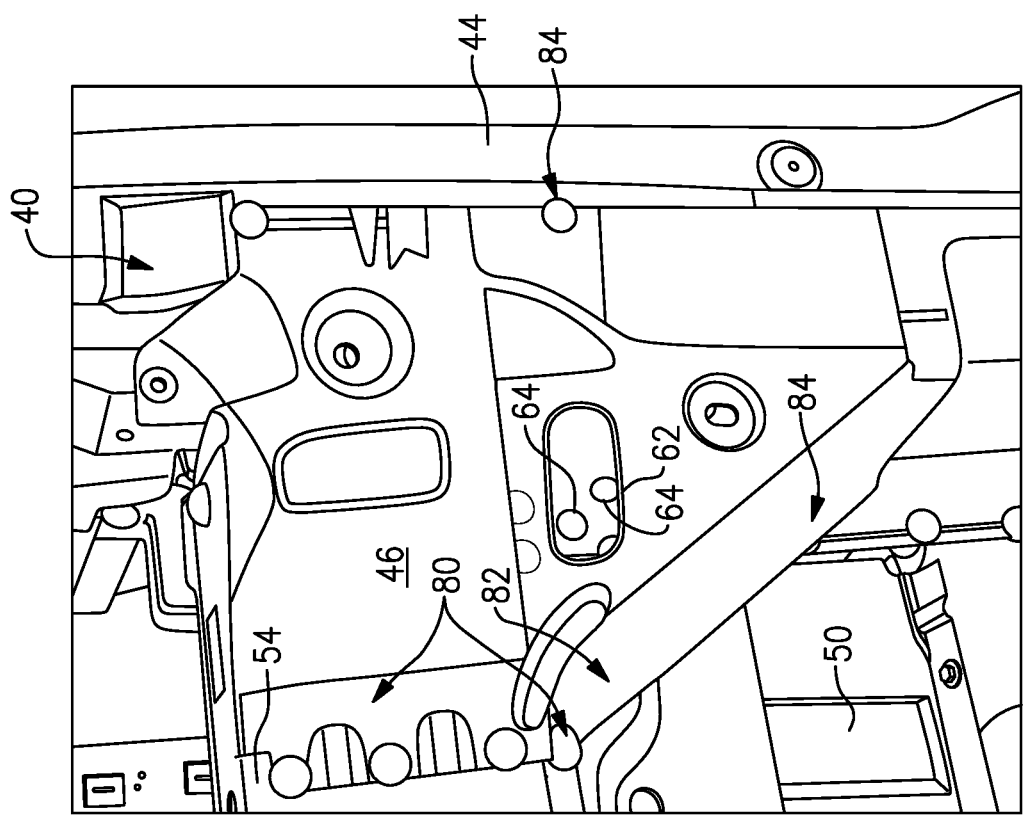
FIG. 5 is an exterior view of a gusset bracket to C-pillar interface.

FIG. 5 is an exterior view of the gusset bracket 46 to C-pillar 40 interface. A C-pillar gusset 46 to box rail 54 joint interface is shown at 80. A C-pillar gusset 46 to box inner panel 50 joint interface is shown at 82. The gusset bracket 46 is gloved over the C-pillar outer panel 44 as shown at 84.

Figure 6:
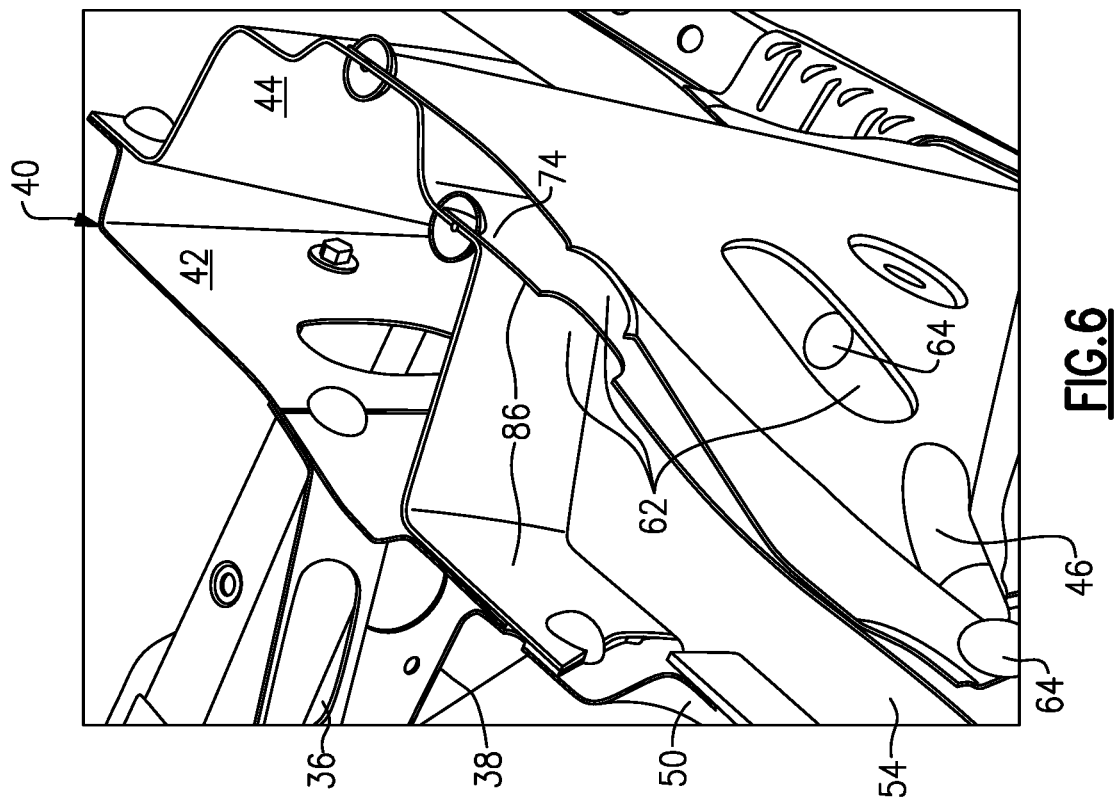
FIG. 6 is a cutaway exterior view of FIG. 5.

FIG. 6 is a cutaway exterior view of FIG. 5. Examples of weld access holes are shown at 62. The box section at the C-pillar to box joint is shown at 86. The box rail 54 to C-pillar outer panel 44 attachment interface is shown at 74.

Figure 8:
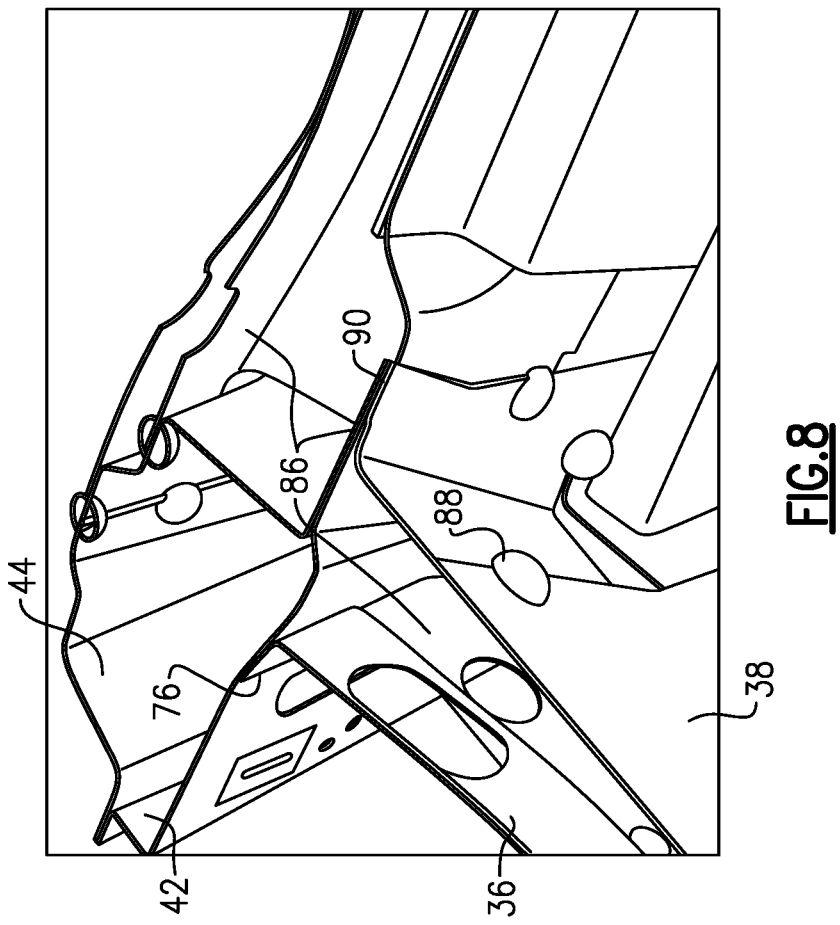
FIG. 8 is a cutaway interior view of FIG. 7.
Figure 7:
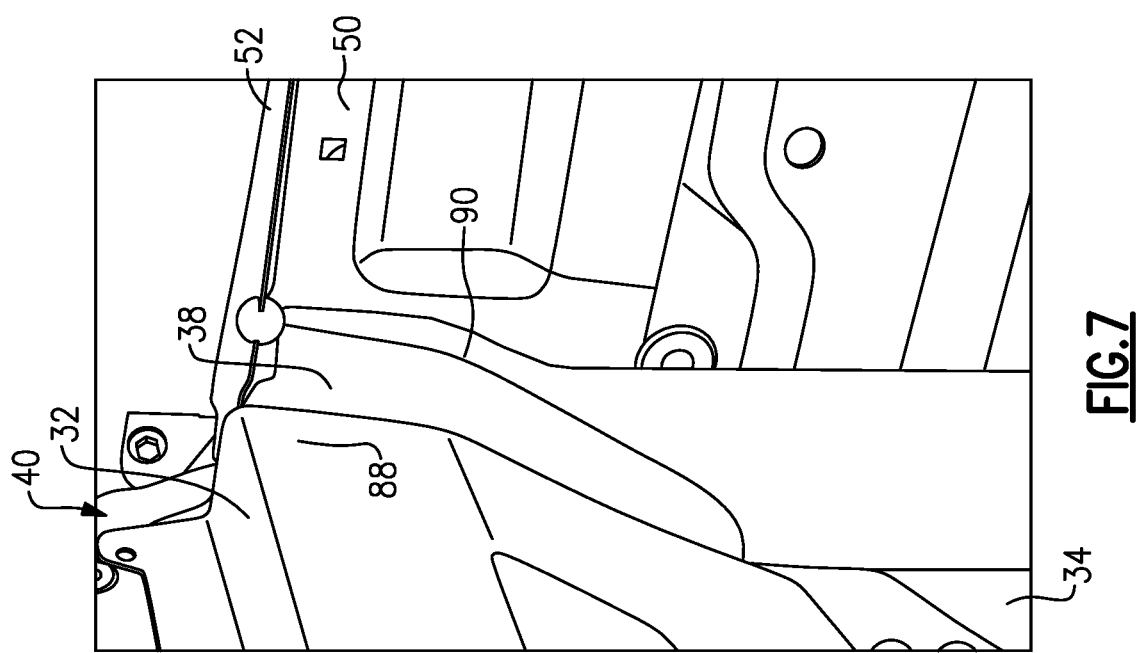
FIG. 7 is an interior view of the C-pillar to box interface.

FIG. 7 is an interior view of the C-pillar 40 to box interface and FIG. 8 is a cutaway interior view of FIG. 7. The cab back outer bracket 38 to cab back interface is shown at 88. The cab back outer bracket 38 to box inner panel 50 and C-pillar 40 joint interface is shown at 90. The box section at the C-pillar 40 to box joint is shown at 86. The cab back inner bracket 38 to C-pillar inner panel 42 joint interface is shown at 76.

Figure 10:
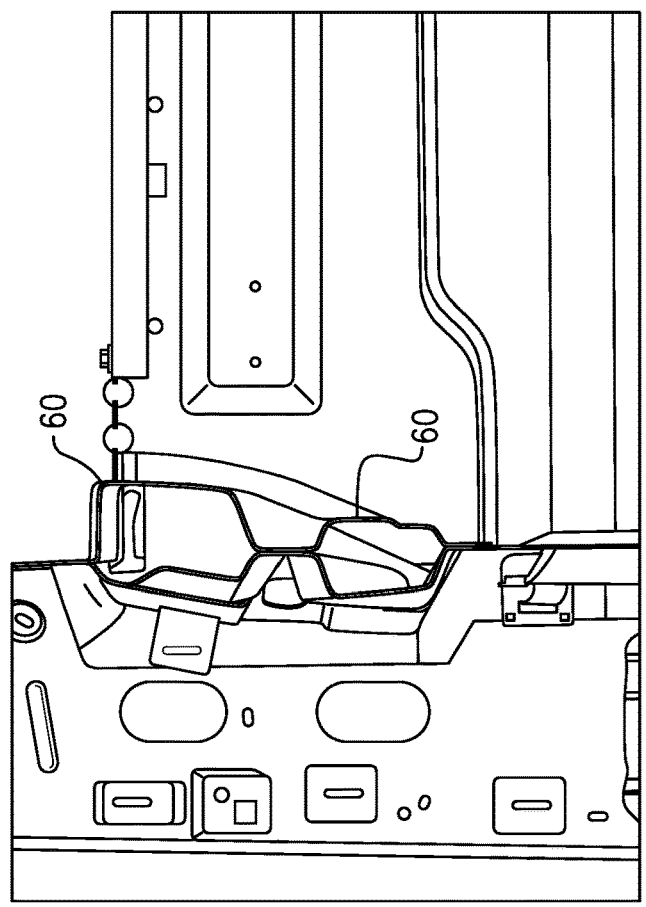
FIG. 10 is a Y section of FIG. 9.
Figure 9:
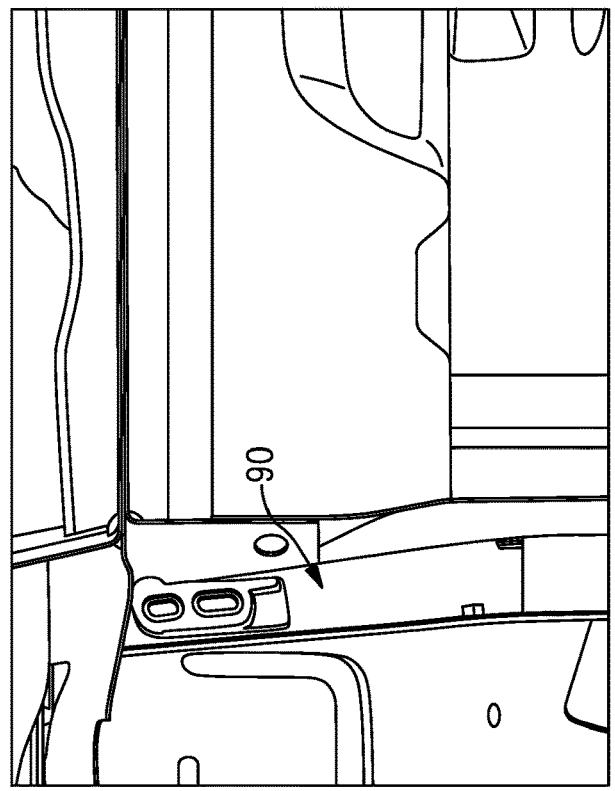
FIG. 9 is a Z section of a back panel continuous box section.

FIG. 9 is a Z section of a back panel continuous box section 92. FIG. 10 is a Y section of FIG. 9. The cab back upper assembly is a continuous cross vehicle double box section 60 as shown in FIG. 10.

The subject disclosure comprises a structural joint 24 that provides the desired vehicle stiffness and torsion, as well as providing the desired vehicle durability performance. The structural joint 24 is also capable of managing seat and seat strap loads, and provides sealing from air and water. Additionally, the structural joint 24 is configured to provide weld access for assembly, to meet exterior appearance standards, and to support tonneau cover installation and performance.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A structural joint for a pickup truck, comprising:
   a pillar;
   a gusset bracket;
   a cab back bracket;
   a box panel;
   wherein the pillar is directly welded to the gusset bracket, the pillar is directly welded to the cab back bracket, and the cab back bracket is welded directly to the box panel to provide an assembly having a box section; and
   wherein the pillar comprises a pillar outer panel and a pillar inner panel that are secured together at a flange interface, and wherein the cab back bracket comprises a cab back outer bracket and a cab back inner bracket, and wherein the cab back outer bracket is also attached to the flange interface, and wherein the cab back inner bracket is attached to the pillar inner panel separate from the cab back outer bracket.

2. The structural joint according to claim 1, wherein the assembly is mated to a cab back lower panel.

3. The structural joint according to claim 1, wherein the pickup truck comprises a unibody pickup truck having a box associated with a cab via the structural joint that comprises the box section, and wherein the box section is continuously maintained along a cross-vehicle width of the box panel.

4. The structural joint according to claim 3, wherein the box panel comprises a box inner panel attached to a box rail, and wherein the cab back bracket is attached to a cab back panel.

5. The structural joint according to claim 1, wherein the assembly is for a unibody configuration.

6. The structural joint according to claim 1, wherein the box panel comprises a box inner panel that is securable to a box rail, and wherein the box inner panel is attached to the flange interface.

7. The structural joint according to claim 6, wherein the gusset bracket is attached to the pillar outer panel at a first attachment and is attached to the box rail at a second attachment that is separate from the first attachment, and wherein the box rail is attached to the pillar outer panel at a third attachment that is separate from the first and second attachments.

8. The structural joint according to claim 7, including a cab back inner panel, a cab back outer panel secured to the cab back inner panel, a cab back lower panel secured to at least the cab back outer panel.

9. A unibody pickup truck, comprising:
   a cab;
   a box associated with the cab via a structural joint;
   wherein the structural joint comprises a pillar, a gusset bracket, a cab back bracket, and a box panel;
   wherein the pillar is directly welded to the gusset bracket, the pillar is directly welded to the cab back bracket, and the cab back bracket is welded directly to the box panel to provide an assembly having a box section; and
   wherein the cab back bracket comprises a cab back outer bracket, and including a cab back inner panel, a cab back outer panel secured to the cab back inner panel, a cab back lower panel secured to at least the cab back outer panel, and a cab back inner bracket that is attached to the pillar separate from the cab back outer bracket.

10. The unibody pickup truck according to claim 9, wherein the assembly is mated to the cab back lower panel.

11. The unibody pickup truck according to claim 10, wherein the pillar comprises a pillar outer panel and a pillar inner panel that are secured together at a flange interface, and wherein the cab back outer bracket is also attached to the flange interface.

12. The unibody pickup truck according to claim 11, wherein the box panel comprises a box inner panel that is securable to a box rail, and wherein the box inner panel is attached to the flange interface.

13. The unibody pickup truck according to claim 12, wherein the gusset bracket is attached to the pillar outer panel at a first attachment and is attached to the box rail at a second attachment that is separate from the first attachment, and wherein the box rail is attached to the pillar outer panel at a third attachment that is separate from the first and second attachments.

14. The unibody pickup truck according to claim 9, wherein the box section is continuously maintained along a cross-vehicle width of the box panel.

15. A method comprising:
   directly welding a pillar directly to a gusset bracket, welding the pillar directly to a cab back bracket, and welding a box panel directly to the cab back bracket to provide an assembly having a box section for a unibody pickup truck;
   wherein the pillar comprises a pillar outer panel and a pillar inner panel that are secured together at a flange interface, and wherein the cab back bracket comprises a cab back outer bracket and a cab back inner bracket;
   attaching the cab back outer bracket to the flange interface; and
   attaching the cab back inner bracket to the pillar inner panel separate from the cab back outer bracket.

16. The method according to claim 15, including associating a box of the unibody pickup truck with a cab via a structural joint that comprises the box section, and wherein the box section is continuously maintained along a cross-vehicle width of the box panel.

17. The method according to claim 15, wherein the box panel comprises a box inner panel attached to a box rail, and wherein the cab back bracket is attached to a cab back panel.

18. The method according to claim 15, including mating the assembly to a cab back lower panel.

19. The method according to claim 15, wherein the flange interface comprises a first flange interface, and wherein the pillar outer panel and the pillar inner panel are secured together at a second flange interface separate from the first flange interface, and including spacing the pillar outer panel and the pillar inner panel apart from each other between the first and second flange interfaces to form an open box section for the pillar.

20. The structural joint according to claim 1, wherein the flange interface comprises a first flange interface, and wherein the pillar outer panel and the pillar inner panel are secured together at a second flange interface separate from the first flange interface, and wherein the pillar outer panel and the pillar inner panel are spaced apart from each other between the first and second flange interfaces to form an open box section for the pillar.

* * * * *